US011104418B2

(12) United States Patent
Faucon et al.

(10) Patent No.: US 11,104,418 B2
(45) Date of Patent: Aug. 31, 2021

(54) FORCE FEEDBACK MECHANISM OF AN AIRCRAFT HANDLING MINI-STICK AND DEVICE FOR HANDLING AN AIRCRAFT HAVING SUCH A MECHANISM

(71) Applicant: LORD Solutions France, Pont de l'Isere (FR)

(72) Inventors: Roch Faucon, Le Peage de Roussillon (FR); Rémi Ponsonnet, Beausemblant (FR); Bastien Roussey, Tain-l'Hermitage (FR)

(73) Assignee: LORD Corporation, Cary, NC (US)

( * ) Notice: Subject to any disclaimer, the term of this patent is extended or adjusted under 35 U.S.C. 154(b) by 239 days.

(21) Appl. No.: 15/603,031

(22) Filed: May 23, 2017

(65) Prior Publication Data
US 2017/0341734 A1    Nov. 30, 2017

(30) Foreign Application Priority Data
May 27, 2016 (FR) ..................................... 1654807

(51) Int. Cl.
*B64C 13/04* (2006.01)
*B64C 13/10* (2006.01)
(Continued)

(52) U.S. Cl.
CPC .......... *B64C 13/0421* (2018.01); *B64C 13/04* (2013.01); *B64C 13/042* (2018.01);
(Continued)

(58) Field of Classification Search
CPC ....... B64C 13/10; B64C 13/28; B64C 13/345; B64C 13/46; B64C 13/507; G05G 1/04
See application file for complete search history.

(56) References Cited

U.S. PATENT DOCUMENTS 2,427,621 A * 9/1947 Peterson ................ G08C 19/00
                                                    74/470
2,756,610 A   7/1956 Hibbard
(Continued)

FOREIGN PATENT DOCUMENTS

WO    2008/017344 A1    2/2008
WO    WO-2008017344 A1 * 2/2008 ............... G05G 1/04

OTHER PUBLICATIONS

Translation of WO 2008/017344 A1 (Year: 2008).*
Search Report issued in connection with French patent application No. 1654807, dated Jan. 26, 2017, 2 pages.

*Primary Examiner* — Richard R. Green
*Assistant Examiner* — Steven J Shur
(74) *Attorney, Agent, or Firm* — Jenkins, Wiison, Taylor & Hunt, P.A.

(57) ABSTRACT

The force feedback device includes a stationary housing intended to be secured to an understructure of an aircraft, at least one spring opposing movement of a side-stick of the aircraft relative to the housing, and a transmission mechanism, which is supported by the housing movably and which is suitable for transmitting a rotational movement, around a first rotation axis, between the side-stick and said at least one spring, by applying a force law according to which a resistive force, opposed by said at least one spring, via the transmission mechanism, against the rotational movement of the side-stick around the first rotation axis, depends on an angular position of the side-stick around the first rotation axis. In order for this force feedback device to be more precise, compact and reliable, the transmission mechanism comprises a cam, which is suitable for being connected to the side-stick in rotation around the first rotation axis and which is provided with at least one profiled surface that is shaped so as to define at least one part of the force law, said at least one part of the force law including at least one force (Continued)

jump that corresponds to a discontinuity in intensity of the resistive force without changing the direction of the latter.

13 Claims, 5 Drawing Sheets

(51) Int. Cl.
    *G05G 5/03*         (2008.04)
    *G05G 5/05*         (2006.01)
    *G05G 1/04*         (2006.01)
    *G05G 9/047*       (2006.01)

(52) U.S. Cl.
    CPC ............... *B64C 13/10* (2013.01); *G05G 5/03* (2013.01); *G05G 5/05* (2013.01); *G05G 1/04* (2013.01); *G05G 2009/04766* (2013.01)

(56) References Cited

U.S. PATENT DOCUMENTS

| | | | |
|---|---|---|---|
| 3,303,714 A * | 2/1967 | Fontaine | B64C 13/24 |
| | | | 74/470 |
| 3,395,878 A * | 8/1968 | Westbury | B64C 13/46 |
| | | | 244/223 |
| 3,870,161 A | 3/1975 | Cording | |
| 5,412,299 A | 5/1995 | Gregory et al. | |
| 7,380,478 B2 * | 6/2008 | Harrington | G05G 1/04 |
| | | | 74/483 R |
| 7,559,510 B1 * | 7/2009 | Bae | B64C 13/0423 |
| | | | 244/223 |
| 9,152,165 B2 * | 10/2015 | Kreitmair-Steck | B64C 27/56 |

* cited by examiner

FORCE FEEDBACK MECHANISM OF AN AIRCRAFT HANDLING MINI-STICK AND DEVICE FOR HANDLING AN AIRCRAFT HAVING SUCH A MECHANISM

CROSS-REFERENCE TO RELATED APPLICATION

The present application claims priority to French Patent Application No. 1654807, filed May 27, 2016, the disclosure of which is incorporated herein by reference in its entirety.

BACKGROUND

The present invention relates to a force feedback device for an aircraft flying side-stick. It also relates to a flying device for an aircraft, including such a force feedback device.

In an aircraft with electronic flight controls, flying is typically provided using a side-stick that is not directly mechanically connected to the moving parts of the aircraft, subject to the aerodynamic forces: this connection is provided by an electronic control chain, including, inter alia, a computer, which controls actuators driving the aforementioned moving parts of the aircraft via signals coming from position sensors of the side-stick. Since there is no direct mechanical interaction between the flying side-stick and the moving parts of the aircraft, the latter do not produce force feedback, also called resistive forces or reactivity feedback, on the side-stick.

Yet the flying of an aircraft cannot be done in a satisfactory manner without feedback of this type, to the pilot, at the side-stick level. In order for resistance to oppose the movement of the side-stick driven by the pilot, it is known to equip these flying devices with a force feedback system, which simulates a resistive force on the side-stick. This resistive force depends on the position of the side-stick: a force law is thus defined that associates any position of the side-stick with an intensity and a direction of the resistive force.

Such a force feedback device may be electronically controlled, as proposed in U.S. Pat. No. 5,412,299.

Another more secure possibility is for the force feedback device to be completely mechanical. Reference is then made to force feedback device, to which the present invention pertains.

Traditionally, such a mechanical force feedback device comprises one or several springs that work, relative to a stationary housing, during the movement of the flying side-stick.

When a single spring is provided, it is understood that the force feedback is proportional to the mechanical stress of the spring: the force law is then typically linear.

When one needs the resistive force to make an abrupt jump at a point of the movement of the side-stick separate from the equilibrium point associated with the "zero" position of the side-stick, the force law must include a force jump, i.e., have a discontinuity in the intensity of the resistive force without changing the direction of this resistive force. To that end, it is known to have two mechanical systems working in parallel. The first mechanical system, which is functional over the entire journey of the side-stick, is stressed by a corresponding spring and provides a first force feedback, based on a linear or variable law with a gentle slope. The second mechanical system begins to operate at a predetermined moment during the movement of the side-stick, owing to clearance in the device: when the movement of the side-stick is such that the aforementioned play is offset, a spring of the second system produces an additional force, added to the base law, supplied by the first system. By providing that the spring of the second system is initially pre-stressed, it will be understood that its contribution creates a jump in the force law. Then, once this force jump has passed, the respective contributions of the two systems are added together on the end of the journey of the flying side-stick. These force feedback mechanisms, which incorporate operating clearance, nevertheless pose initial adjustment problems, as well as problems with drifting over time because their parts subject to the aforementioned play become worn, typically by friction and/or burring.

In a field different from that of flying an aircraft, WO 2008/017344 discloses a joystick for a freight loading system. This joystick includes a shaft, which is mounted rotating around a stationary axis and one end of which defines a V-shaped profiled surface. A roller, which rolls over this V-shaped profiled surface, is pressed against the latter by a tilting lever, the movements of which are stressed by springs such that when the user ceases to stress the shaft after having moved it away from the neutral position in which the roller is in the bottom of the aforementioned V-shaped profile, the spring acts on the lever by elastic return, which then returns the roller to the bottom of the V-shaped profile, and thereby drives the shaft to its aforementioned neutral position. The shaft is thus associated with an automatic return mechanism to the neutral position, but is not associated with a force feedback mechanism in the sense defined above, which is also consistent with the technical field affected by WO 2008/017344.

SUMMARY

The aim of the present invention is to propose, to equip a flying side-stick of an aircraft, a mechanical force feedback device using a force law with jump(s) that is more precise, more reliable, safer, more compact, and significantly less expensive.

To that end, the invention relates to a force feedback device for an aircraft flying side-stick, the force feedback device including:

a stationary housing designed to be secured to an understructure of an aircraft, at least one spring that opposes movement of a side-stick of the aircraft relative to the housing, and a transmission mechanism, which is supported by the housing movably and which is suitable for transmitting a rotational movement, around a first rotation axis, between the side-stick and said at least one spring, by applying a force law according to which a resistive force, opposed by said at least one spring, via the transmission mechanism, against the rotational movement of the side-stick around the first rotation axis, depends on an angular position of the side-stick around the first rotation axis, wherein this transmission mechanism comprises a cam, which is suitable for being connected to the side-stick in rotation around the first rotation axis and which is provided with at least one profiled surface that is shaped so as to define at least one part of the force law, said at least one part of the force law including at least one force jump that corresponds to a discontinuity in intensity of the resistive force without changing the direction of the resistive force.

One of the ideas at the base of the invention is to profile, based on the force law that one wishes to apply to the flying side-stick and that includes one or several force jumps, a part rotatably connected to the side-stick, in other words a cam, integrated into the means for transmitting movement between the side-stick and a single associated spring. In practice, a cam follower is advantageously provided both to be pressed, by the single associated spring, against the profiled surface of the cam and to roll against this profiled surface during the movement of the cam rotated by the flying side-stick. Contrary to the prejudices in the field, the precise configuration of the profiled surface of the cam, followed by the roller during the rolling of the latter, makes it possible to provide the desired force law, including one or several force jumps therein. The profiled surface of the cam advantageously has a continuous profile for the rolling of the roller, avoiding any mechanical drift related to breaks in contact or non-rolling friction between the roller and the cam. In all cases, the force feedback device according to the invention is thus precise and reliable, in particular over time. Furthermore, the number of component parts of this force feedback device is limited, and their assembly requires few adjustments, which means that the device according to the invention is compact and cost-effective.

According to additional advantageous features of the force feedback device according to the invention:

Said at least one profiled surface has a continuous profile for rolling of a cam follower, which belongs to the transmission mechanism and which is pressed against said at least one profiled surface by said at least one spring.

Said at least one profiled surface is turned opposite the first rotation axis.

Said at least one profiled surface is turned toward the first rotation axis.

The force feedback device is provided with two springs and with two profiled surfaces that are respectively associated with the two springs and that are symmetrical relative to a median geometric plane, defined by the housing and containing the first rotation axis.

The transmission mechanism further comprises, for each of the two springs, a roller support, which is mounted rotating freely on the housing around a second rotation axis and on which a roller is mounted freely rotating around a third rotation axis to roll against the profiled surface that is associated with the spring, the second and third rotation axes being separate and parallel to the first rotation axis; and opposite ends of each spring are respectively assembled to the housing and the corresponding roller support so as both to stress the spring and press the corresponding roller against the profiled surface associated with the spring.

At least one of the two roller supports, respectively associated with the two springs, is mounted freely rotating on the housing around the corresponding second rotation axis via a picking cam.

The opposite ends of each spring are respectively articulated on the housing and the corresponding roller support.

The force feedback device is provided with a single spring and a single profiled surface.

The transmission mechanism further comprises a roller support, which is mounted rotating freely on the housing around a second rotation axis and on which a roller is mounted freely rotating around a third rotation axis to roll against the profiled surface, the second and third rotation axes being separate and parallel to the first rotation axis; and opposite ends of the spring are respectively assembled to the housing and the roller support so as both to stress the spring and press the roller against the profiled surface.

The opposite ends of the spring are respectively articulated on the housing and the roller support.

Said at least one spring is chosen from among a tension spring, a compression spring and a torsion spring.

The invention also relates to a flying device for an aircraft, including a side-stick for flying the aircraft, and a force feedback device as defined above. The housing of the force feedback device is secured to an understructure of the aircraft, and the cam of the force feedback device is connected to the side-stick in rotation around the first rotation axis.

The invention will be better understood upon reading the following description, provided solely as an example and done in reference to the drawings, in which:

DETAILED DESCRIPTION

FIGS. 1 to 4 show a mechanical force feedback device 1 for a flying side-stick 2 of an aircraft. The flying side-stick 2 is only shown in FIG. 1, partially and schematically, in dotted lines.

The force feedback device 1 comprises a stationary housing 10, which, within the aircraft to be handled by the side-stick 2, is designed to be secured to an understructure of this aircraft. The embodiment of the housing 10, as well as the details of securing thereof to the understructure of the aircraft, are not limiting with respect to the present invention and are therefore not described in more detail here.

The force feedback device 1 also comprises a piece 20 moving relative to the housing 10, this piece 20 being connected to the flying side-stick 2 rotating around a rotation axis X1 defined relative to the housing 10. In the example embodiment considered in the figures, this rotating piece 20 is arranged on the side of the housing 10, turned opposite the reader in FIGS. 1 to 3. In practice, the embodiment of this rotating piece 20 is not limiting with respect to the invention inasmuch as the side-stick 2 and this piece 20 are connected to one another in rotation around the axis X1, the rotation of the side-stick 1 around the axis X1 causing a corresponding rotation of the piece 20, and vice versa. As an example embodiment, the rotating piece 20 is supported by the housing 10 with the insertion of a bearing or rolling bearing.

The force feedback device 1 further comprises a cam 30 that is connected to the flying side-stick 2 rotating around the axis X1. In the example embodiment considered in the figures, this cam 30 is arranged on the side of the housing 10, turned toward the reader in FIGS. 1 to 3. As an example embodiment, the cam 30 is fixedly secured to the rotating piece 20. Irrespective of the embodiment of the cam 30, the rotation of the flying side-stick 2 around the axis X1 causes a corresponding rotation of the cam 30, here via the rotating piece 20, and vice versa, as shown by comparing FIGS. 2 and 3.

Figure 1:
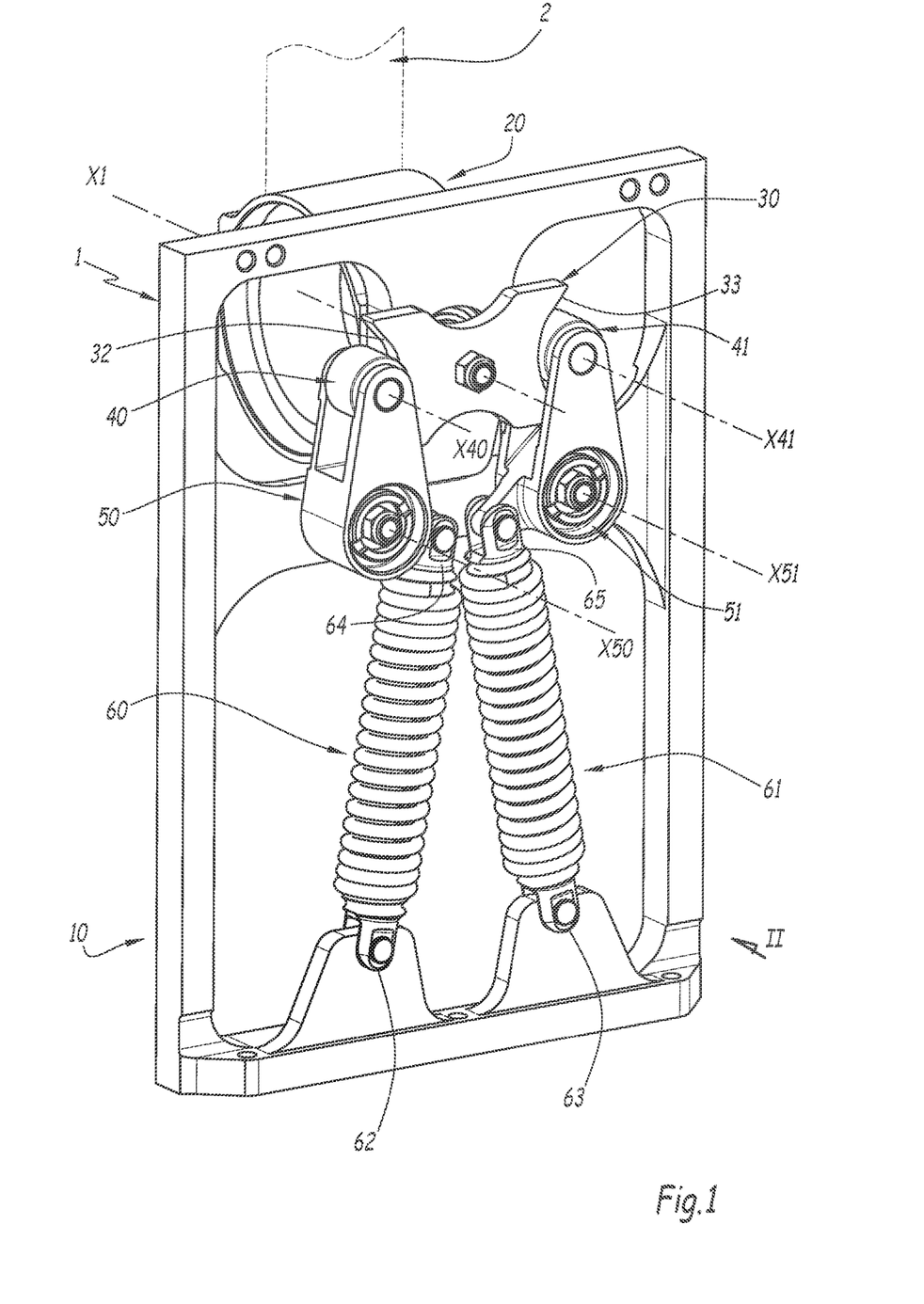
FIG. 1 is a perspective view of a force feedback device according to the invention.
Figure 2:
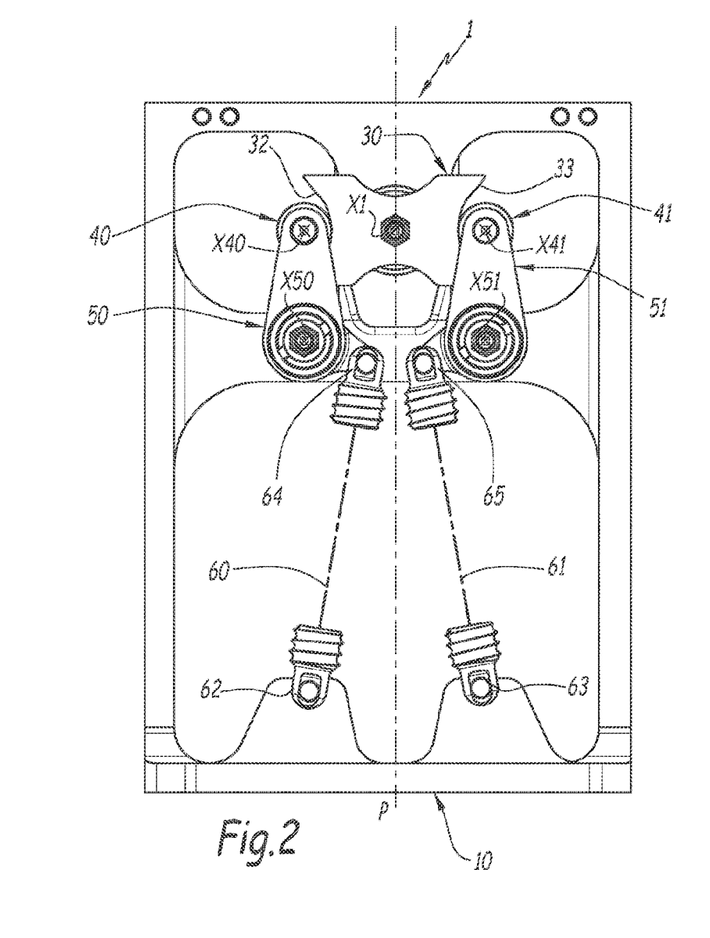
FIG. 2 is an elevation view, along arrow II of FIG. 1, of part of the force feedback device of FIG. 1.
Figure 3:
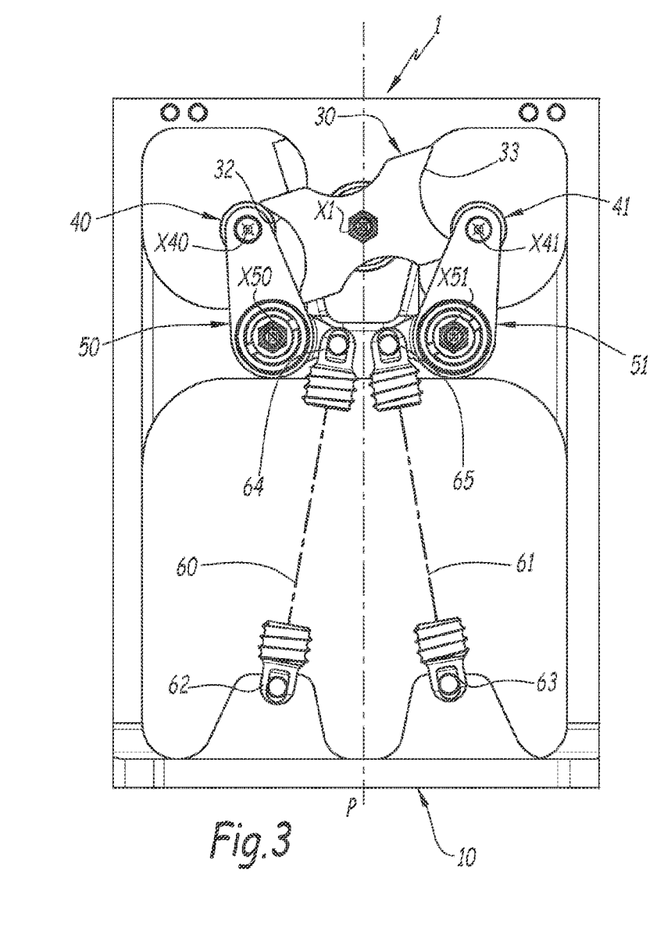
FIG. 3 is a view similar to FIG. 2, showing the force feedback device in an operating configuration different from that shown in FIGS. 1 and 2.

As clearly shown in FIGS. 1 to 3, the cam 30 is provided, on either side of the axis X1, with lateral surfaces 32 and 33, which are opposite one another and, in the embodiment considered in the figures, are each turned opposite the axis X1. The respective profiles of these surfaces 32 and 33 will be described in more detail below, having henceforth noted that in the example embodiment considered here, the surfaces 32 and 33 are symmetrical to one another relative to a median geometric plane P, defined by the housing 10 and containing the axis X1.

The force feedback device 1 further comprises two rollers 40 and 41, which are identical to one another and which are arranged on either side of and at a distance from the axis X1. The roller 40, 41 is designed to roll freely, around its central axis X40, X41, over the surface 32, 33 of the cam 30, following the profile of this surface 32, 33.

To that end, the rollers 40 and 41 are respectively supported by roller supports 50 and 51, on each of which the corresponding roller is mounted rotating freely around its axis X40, X41. Each roller support 50, 51 is in turn mounted rotating freely on the housing 10 around a corresponding axis X50, X51, these axes X50 and X51 being defined by the housing 10. As clearly shown in FIGS. 1 to 3, the axes X1, X40, X41, X50 and X51 are separate from one another and extend parallel to one another. For reasons that will appear later, and which are related to the example embodiment considered in the figures, the axes X40 and X41 are symmetrical to one another relative to the axis X1, while the axes X50 and X51 are symmetrical to one another relative to the plane P.

The force feedback device 1 also comprises two springs 60 and 61, the spring 60 being functionally associated with the roller 40 and the corresponding roller support 50, while the spring 61 is functionally associated with the roller 41 and the corresponding roller support 51. The springs 60 and 61 are arranged symmetrically to one another relative to the aforementioned geometric plane P: one end 62, 63 of the spring 60, 61 is assembled, in particular in an articulated manner, to the housing 10, while the opposite end 64, 65 of the spring 60, 61 is assembled, in particular in an articulated manner, to the corresponding roller support 50, 51. Within the force feedback device 1, each of the springs 60 and 61 is integrated while being stressed, the corresponding stress of the spring being transmitted, relative to the stationary housing 10, to the corresponding roller support 50, 51 so as to press the corresponding roller 40, 41 against the associated surface 32, 33 of the cam 30, the contact force between the roller and the cam being oriented toward the axis X1. In the example embodiment considered in the figures, it will be understood that the total force resulting therefrom on the cam 30 consists of two contributions, respectively associated with the spring 60, via the roller support 50 and the roller 40, and the spring 61, via the roller support 51 and the roller 41: due to the symmetry of this embodiment, each of the aforementioned contributions respectively corresponds to about half of the total resultant applied to the cam 30. In other words, it will be understood that in the embodiment considered in figures, the force contributions, respectively associated with the springs 60 and 61, are somewhat redundant by allowing operation in a downgraded mode, inasmuch as, by way of alternative that is not shown, only one of the two springs 60 and 61, associated with the corresponding roller and roller support, is sufficient to provide a variable force chain between the cam 30 and the housing 10 at a lower force level.

As an advantageous option, in particular seeking to facilitate the initial assembly of this embodiment, at least one of the roller supports 50 and 51 is supported by the housing 10, via a picking cam which allows a fine adjustment of the position of the corresponding axis X50, X51 relative to the housing 10, thus avoiding any redundant constraints of the force feedback device 1.

More generally, irrespective of the details of the embodiment of the force feedback device 1, it will be understood that each spring 60, 61 opposes the rotational movement around the axis X1 by the cam 30 and therefore by the flying side-stick 2, relative to the stationary housing 10: indeed, the rotating movements of the side-stick 2 around the axis X1 are transmitted to the spring 60, to the spring 61, respectively, successively by the cam 30, the roller 40, the roller 41, respectively, and the roller support 50, the roller support 51, respectively, in return both for the rolling of the roller 40, the roller 41, respectively, around its axis X40, X41 on the surface 32, 33, respectively, of the cam 30, and the free tilting of the roller support 50, the roller support 51, respectively, around the corresponding axis X50, X51, relative to the housing 10, as shown by comparing FIGS. 2 and 3. Of course, the transmission equipment described above is reversible between each of the springs 60 and 61 and the flying side-stick 2. Thus, the rotating piece 20, the cam 30, the rollers 40 and 41 and the roller supports 50 and 51 jointly form a transmission mechanism belonging to the force feedback device 1: this transmission mechanism makes it possible to transmit the rotating movements around the axis X1 between the side-stick 2 and the springs 60 and 61.

In practice, in the extension of the considerations developed in the introductory part of this document, it will be understood that no flying information in the "pilot to aircraft" direction is transmitted from the flying side-stick 2, via the mechanical force feedback device 1.

Figure 5:
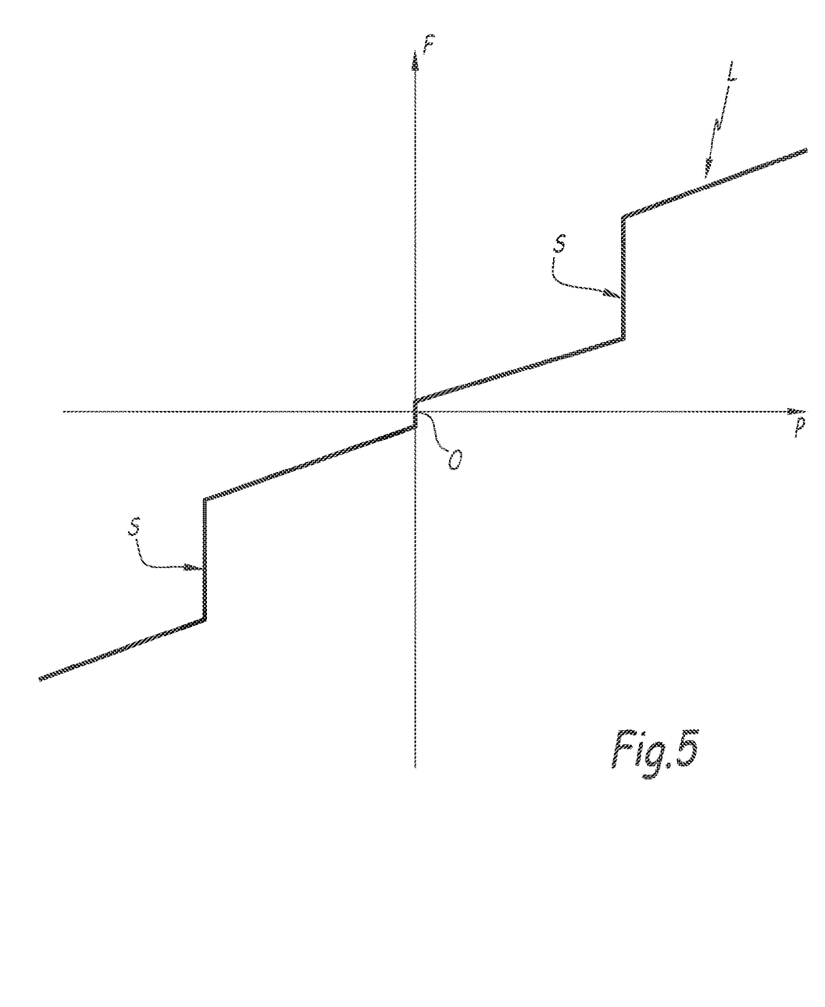
FIG. 5 is a graph of a force law associated with the part of the piece, shown in FIG. 4.
Figure 6:
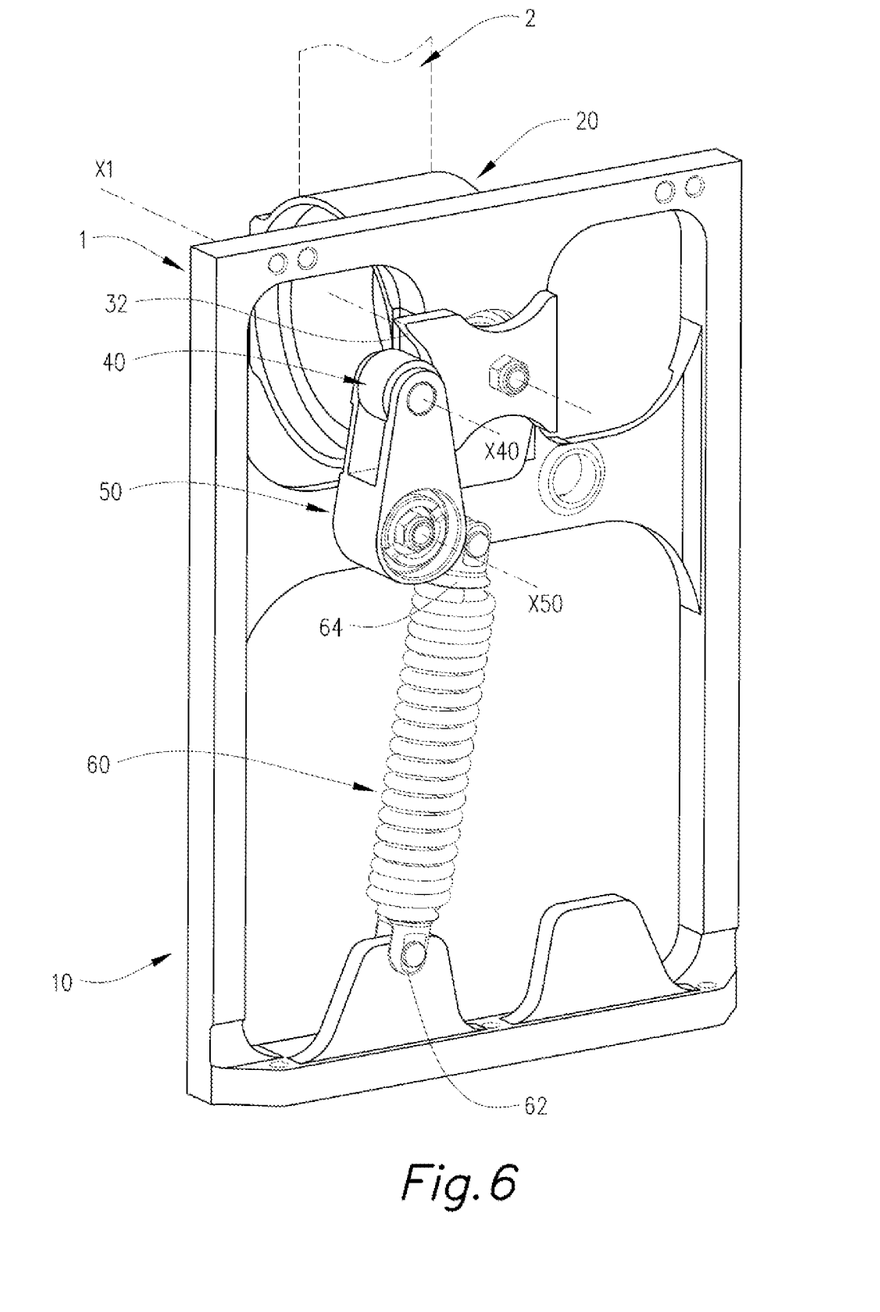
FIG. 6 is a perspective view of a force feedback device according to the invention having a single spring.
Figure 7:
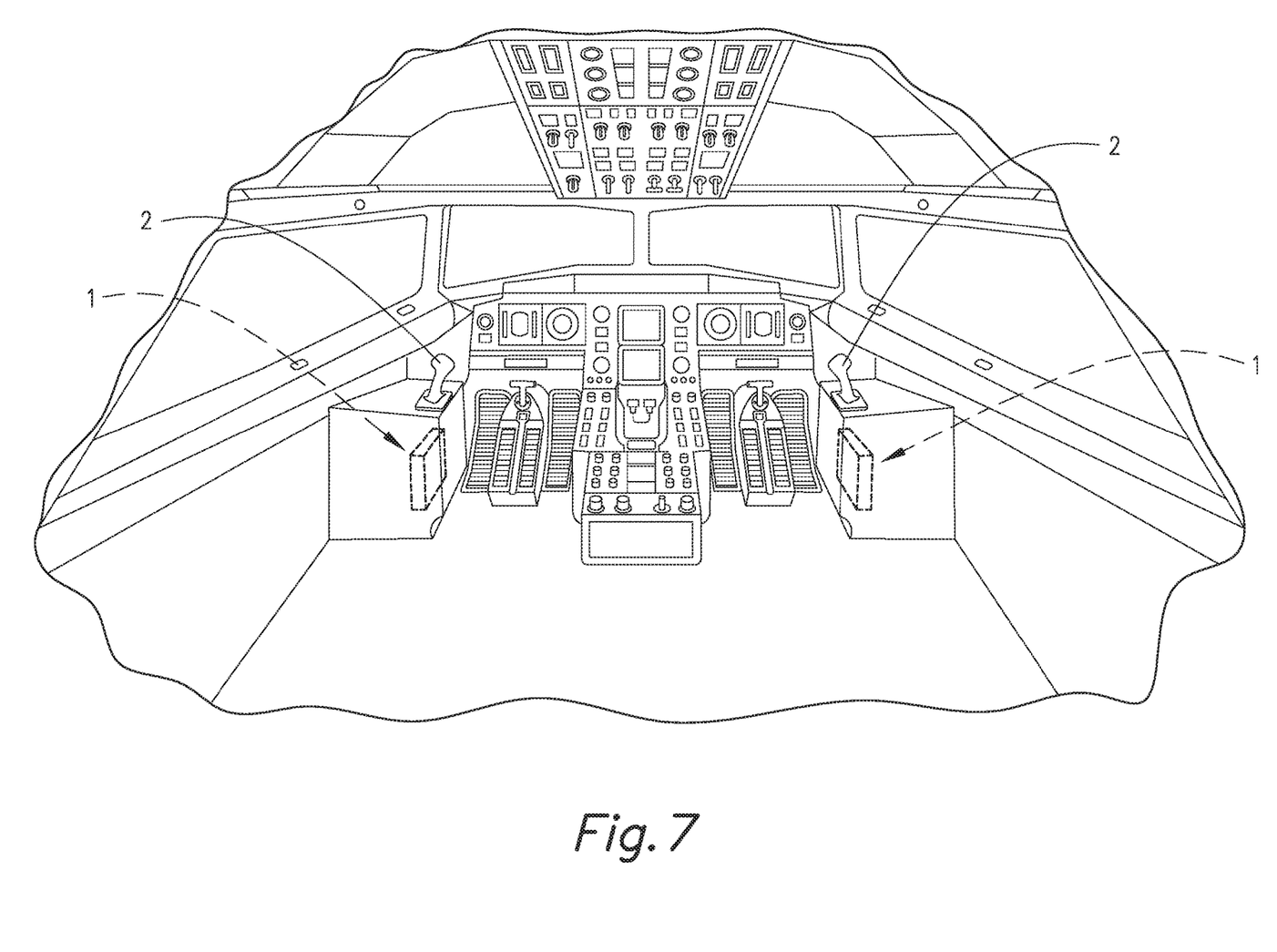
FIG. 7 is a perspective view of a generic aircraft cockpit illustrating the location of the force feedback device and flying side-stick controller in the structure of the aircraft cockpit.

The relative resistance opposed by the springs 60 and 61 against the rotating movement, around the axis X1 of the flying side-stick 2, via the aforementioned transmission mechanism, is done according to a predetermined force law, which associates a resistance force with any rotational position of the side-stick. This force law, which is determined during the design of the force feedback device 1 and an example of which, referenced L, is provided in FIG. 5, schematically showing the variation of the resistive force F as a function of the angular position P, around the axis X1, of the flying side-stick 2, conditions the shape of the surfaces 32 and 33 of the cam 30, more specifically the respective profiles of these surfaces 32 and 33, against which the cam followers 40 and 41 roll. Thus, by applying the force law L, the intensity and direction of the resistive force on the flying side-stick 2, produced by each of the springs 60 and 61, are modulated as a function of the rolling position of the corresponding roller 40 or 41 on the profile of the corresponding surface 32 or 33 of the cam 30, having recalled that the latter is rotatably connected to the side-stick 2, around the axis X1.

Advantageously, this profile of each surface 32, 33 is continuous for the rolling of the corresponding roller 40, 41, inasmuch as over the entire rolling travel of the roller 40, 41 on the corresponding surface 32, 33 of the cam 3, the roller is kept constantly in contact with this surface in at least one effective contact zone, thus precluding any contact play between the rollers and the cam or any unsticking between the rollers and the cam.

Figure 4:
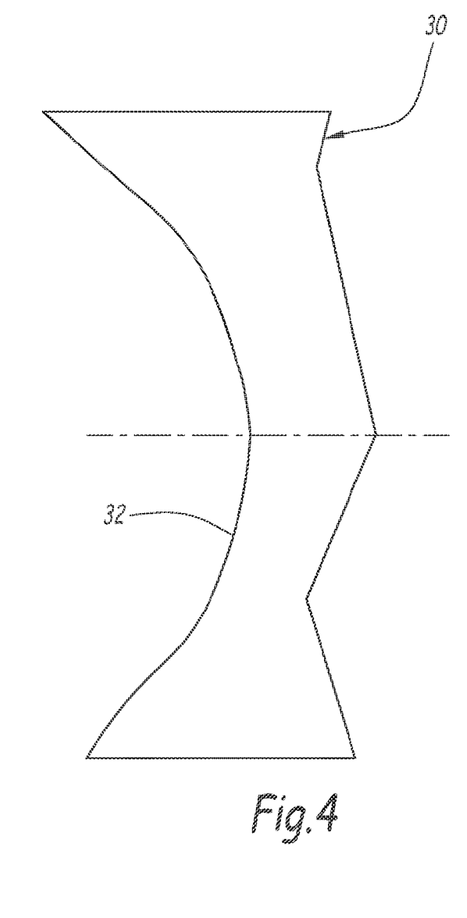
FIG. 4 is a larger-scale view of only part of a piece of the force feedback device of FIGS. 1 to 3.

According to the invention, the force law L, as a function of which the surfaces 32 and 33 of the cam 30 are profiled, includes one or several force jumps, i.e., one or several discontinuities of the intensity of the resistive force F without changing the direction of this resistive force F, for example jumps referenced S in FIG. 5. It will be noted that the force jumps S in question are different from the discontinuity that is combined with the vertical axis in FIG. 5: the just aforesaid discontinuity corresponds to a pre-stress of the force feedback device 1, causing a non-zero value for the intensity of the resistive force F at an equilibrium point of the force feedback device, this equilibrium being associated both with a zero position of the side-stick 2, referenced 0 in FIG. 5, and a change of direction of the resistive force F on either side of this zero position. Thus, the profiled surfaces 32 and 33 are configured to define the force law L with both its discontinuity of the equilibrium point and its force jumps S, while advantageously retaining a continuous profile, as illustrated in FIG. 4, which shows the profile of the surface 32 of the cam 30, associated with the force law F of FIG. 5.

The use of the cam 30 and its profiled surfaces 32 and 33 as a function of the force law L thus makes it possible, at each force jump S, to obtain, advantageously continuously, a discontinuous variation without directional change, of the resistive force F at the rolling interface between these surfaces and the corresponding rollers 40 and 41, for a very small deviation of the angular position P around the axis X1. For each of the profiled surfaces 32 and 33, this variation of the resistive force causes only a single spring to work, i.e., the corresponding spring 60, 61, respectively, continuously, over the entire application domain of the force law L, including during the force jump(s) S of this force law.

In practice, the specificities of the force law L are not limiting with respect to the invention. Thus, as an alternative that is not shown, the force law may have no discontinuity at the equilibrium point of the force feedback device. Likewise, the force law may be linear or nonlinear.

Various developments and alternatives of the mechanical force feedback device 1 described thus far can also be considered:

as explained above, only one of the two springs 60 and 61, associated with the corresponding roller 40 or 41 and the corresponding roller support 50 or 51, is sufficient to have a functional and effective force feedback device;

subject to the development of the interfaces and the geometry of the pieces, the or each spring 60 and 61 can indifferently be a tension spring, a compression spring or a torsion spring;

rather than being turned opposite the axis X1, the or each of the profiled surfaces 32 and 33 of the cam 30 can be turned toward the rotation axis X1, the corresponding roller 40 or 41 then being pressed, under the action of the corresponding spring, against this profiled surface with a pressing force moving away from the axis X1; and/or the use, explained above, of the profiled surfaces 32 and 33 of the cam 30 can be provided only for part of the force law applied by the transmission mechanism of the force feedback device 1, this part including one or several force jumps like the force jumps S previously described; in this case, the rest of the force law is defined by other developments, known in the art, integrated into the transmission mechanism.

The invention claimed is:

1. A force feedback device for an aircraft flying side-stick, the force feedback device including:

a stationary housing designed to be secured to an understructure of an aircraft, at least one spring that opposes movement of a side-stick of the aircraft relative to the housing, and a transmission mechanism, which is movably supported by the housing and is configured to transmit a rotational movement, around a first rotation axis, between the side-stick and the at least one spring by applying a force law, according to which a resistive force is generated to resist the rotational movement of the side-stick around the first rotation axis, wherein the resistive force depends on an angular position of the side-stick around the first rotation axis and is generated by the at least one spring via the transmission mechanism, wherein the transmission mechanism comprises a cam, which is configured for connection to the side-stick in rotation around the first rotation axis and comprises at least one profiled surface that is shaped to define at least one part of the force law, wherein the at least one part of the force law comprises at least one force jump that corresponds to a discontinuity in intensity of the resistive force without changing a direction of the resistive force.

2. The force feedback device according to claim 1, wherein the at least one profiled surface has a continuous profile for rolling of a cam follower of the transmission mechanism, wherein the cam follower is configured for being pressed against the at least one profiled surface by the at least one spring.

3. The force feedback device according to claim 1, wherein the at least one profiled surface is configured to turn in an opposite direction about the first rotation axis, relative to the rotational movement between the side-stick and the at least one spring.

4. The force feedback device according to claim 1, wherein the at least one profiled surface is configured to turn in a same direction about the first rotation axis, relative to the rotational movement between the side-stick and the at least one spring.

5. The force feedback device according to claim 1, wherein the at least one spring comprises two springs and the at least one profiled surface comprises two profiled surfaces, wherein the two profiled surfaces form opposite sides of the cam, such that each of the two profiled surfaces are associated, respectively, with a corresponding one of the two springs and are symmetrical relative to a median geometric plane, wherein the median geometric plane is defined by the housing and contains the first rotation axis.

6. The force feedback device according to claim 5, wherein the transmission mechanism comprises, for each of the two springs, a corresponding roller support, which is mounted to rotate freely on the housing around a second rotation axis and on which a roller is mounted to rotate freely around a third rotation axis to roll against a respective one of the two profiled surfaces associated with the corresponding one of the two springs, wherein each roller is positioned on one of the opposite sides of the cam and in contact with one of the two profile surfaces, wherein the second and third rotation axes are separate from, and parallel to, the first rotation axis, and wherein opposite ends of each spring are respectively assembled to the housing and the corresponding roller support to stress the spring and press the corresponding roller against the respective one of the two profiled surfaces associated with the spring.

7. The force feedback device according to claim 6, wherein at least one of the roller supports, respectively associated with the two springs, is mounted to rotate freely on the housing around the corresponding second rotation axis via a picking cam.

8. The force feedback device according to claim 6, wherein the opposite ends of each spring are respectively articulated on the housing and the corresponding roller support.

9. The force feedback device according to claim 1, wherein the at least one spring is only a single spring and the at least one profiled surface is only a single profiled surface.

10. The force feedback device according to claim 9, wherein the transmission mechanism comprises a roller support, which is mounted to rotate freely on the housing around a second rotation axis and on which a roller is mounted to rotate freely around a third rotation axis to roll against the profiled surface, the second and third rotation axes being separate from, and parallel to, the first rotation axis, and wherein opposite ends of the single spring are respectively assembled to the housing and the roller support to stress the single spring and press the roller against the single profiled surface.

11. The force feedback device according to claim 10, wherein the opposite ends of the spring are respectively articulated on the housing and the roller support.

12. The force feedback device according to claim 1, wherein the at least one spring comprises a tension spring, a compression spring, or a torsion spring.

13. A flying device for an aircraft, the flying device comprising:
- a side-stick for flying the aircraft, and
- a force feedback device according to claim 1, wherein the housing of the force feedback device is secured to the understructure of the aircraft,
- wherein the cam of the force feedback device is connected to the side-stick in rotation around the first rotation axis.

\* \* \* \* \*